May 5, 1936. J. W. HARGRAVE 2,039,900

HANDLE CONNECTER

Filed Nov. 8, 1935

Inventor
James W. Hargrave
By
Attorney

Patented May 5, 1936

2,039,900

UNITED STATES PATENT OFFICE 2,039,900

HANDLE CONNECTER

James W. Hargrave, Mertzon, Tex.

Application November 8, 1935, Serial No. 48,917

5 Claims. (Cl. 306—35)

This invention is directed to an improvement in handle connecters through the use of which a separate and independent handle employed in connection with various implements and tools may be rigidly connected to the implement proper in a manner to insure the rigidity of the connection and to further practically insure the permanence of the connection for practically the life of the implement or handle.

In connection with tools of a certain type, as for example axes, sledge hammers, ordinary hammers, hatchets and tools of this character with which the invention is more particularly concerned, many attempts have been made to provide for a more or less permanent and rigid connection between the handle and tool implement. Ordinarily the handles are of wood and, generally speaking, the accepted manner of connection is through the use of a wedge to be driven into the end of the handle after fitting the handle end within the eye of the tool or implement in order to tightly wedge such handle end in the eye. However, experience has demonstrated that in the continued reuse of the tool or implement, the wedge works loose and the handle no longer presents the rigid, immovable connection with the tool or implement and must be retightened or replaced.

The ideal connection between the handle and implement is one which will maintain a rigid, firm connection and yet possess the capabilities of ready and convenient removal to take care, for example, of those occasions in which the handle, either through breakage or wear, must be replaced.

The primary object of the invention, therefore, is the provision of a connection in which the wooden or like handle is fitted within and securely held in rigid relation in the eye of the implement in a manner to permit convenient separation of the handle and implement whenever necessary or desired.

Structurally considered, the actual connection primarily involves an element cooperating with the tool or implement and held against movement in the direction of the handle fitting, with such element rigidly connected to the handle proper by a wood or other screw which not only tends to form a firm connection but creates a tendency to move the handle proper farther into the eye incident to the drawing effect of the screw, together with readily separable means which cooperates with the element and engages the wood screw to absolutely prevent any possibility of rotative or endwise movement of said wood screw. Thus, the handle and implement are rigidly connected against separation in use while at the same time the connection may be removed at will in a simple and convenient manner to release the handle for replacement.

The invention is illustrated in the accompanying drawing, in which.

The improved connecter is shown as connecting an ax head and handle. This is merely illustrative of any and all types of tools or implements with which a handle is to be removably connected for the use of the implement, such for example as sledge hammers, ordinary hammers, hatchets and similar types of implements.

The ax head I is of the usual type provided with a conventional handle-receiving eye 2. The handle 3 which is shaped at one end to fit within the eye 2 is, aside from the specific details hereinafter referred to, of conventional or any desired configuration or material.

Figure 1:
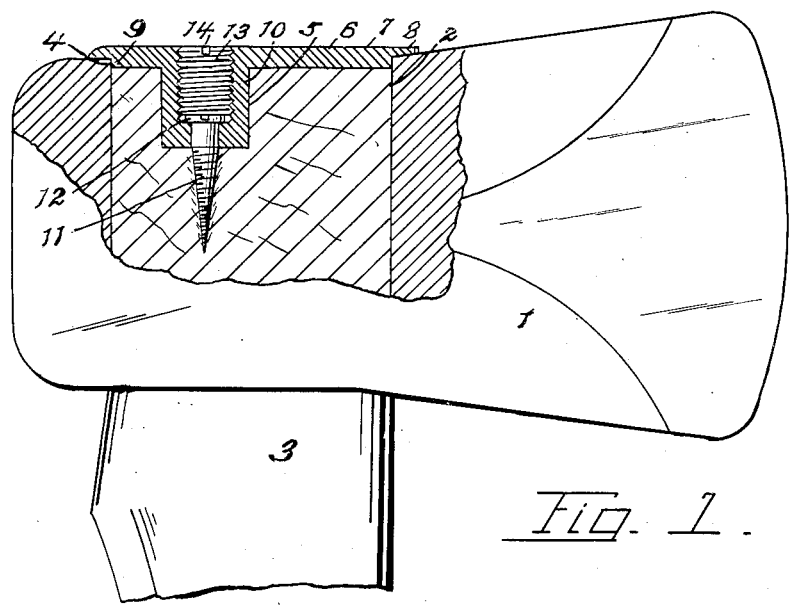
Figure 1 is a view in elevation, partly broken out, showing the improved connecting means in use with an ax and the handle thereof.
Figure 3:
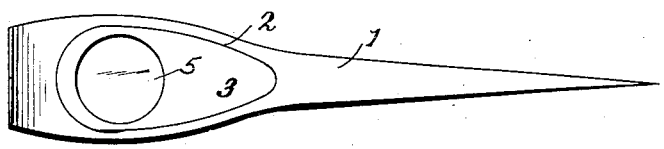
Figure 3 is an edge view showing the handle in the ax head with the connecting elements removed and the handle end formed for cooperation with such elements.
Figure 2:
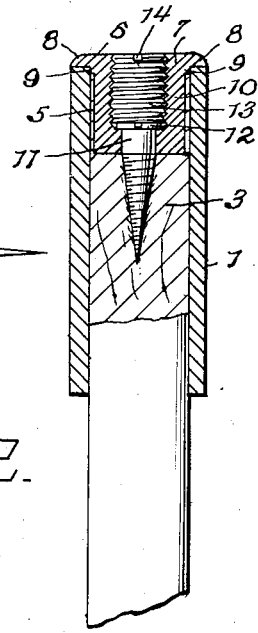
Figure 2 is a sectional view, partly in elevation, taken at right angles to Figure 1.
Figure 4:
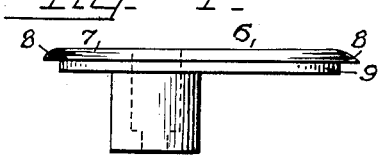
Figure 4 is an edge view of the plate element cooperating with the implement and with the handle.

As particularly noted in Figures 1 and 2, that portion of the handle 3 within the eye of the implement head enters from the inner side of the eye and terminates slightly short of the outer side of the eye, leaving a slight margin, indicated at 4, of the wall of the eye beyond the end of the ax handle.

The end of the ax handle, preferably closer adjacent that edge of the handle remote from the operative edge of the implement than the opposite edge of such handle, is formed with a circular depression 5 which extends into the end of the handle for an appropriate distance which may at will be varied in depth to suit different characters of implements, as will be appreciated.

The holding element 6 is formed to engage the edge of the wall surrounding the eye of the ax at that end of the eye beyond the inserted end of the handle. This holding element comprises a plate 7 which conforms in exterior shape to that of the eye and has an edge flange 8 to overlie and bear upon the metal of the implement proper about the outline of the eye.

Inwardly of the flange 8, the plate is of increased thickness to provide a portion 9 which snugly fits within the eye and bears directly on the end of the handle 3. At an appropriate point, the holding element is provided with a hollow projection 10 which snugly fits in all dimensions within the depression 5 in the end of the handle.

As thus constructed, the holding element bears upon the metal of the implement head surrounding the eye, fits snugly within the eye to bear upon the end of the handle and has an extension which snugly fits, in exterior shape and depth, a depression formed in the end of the handle. Obviously, the holding element, therefore, overlies and completes the cooperation of the handle and eye and, by reason of the flange 8, is prevented from movement in the direction in which the handle would be moved in withdrawing it from the head 1.

In order to secure the holding element and handle, a wood screw 11 of appropriate length and thread pitch is passed through an opening in the bottom of the projection 10 and threaded directly into the material of the handle. This screw 11 rigidly connects the handle and holding element and obviously, if this connection is maintained, there can be no separation or relative movement between the head 1 and handle 3.

However, it is of course apparent that in continued use of an implement connected merely by the screw 11, the latter would tend to work loose, but if means are provided by which the wood screw is prevented from turning or moving in a release direction, or, in other words, held rigidly in place after being set, it is obvious that the connection will be maintained during practically the life of the handle.

It will be noted that the head 12 of the screw seats squarely against the bottom of the hollow projection 10 and in order to prevent any movement of the wood screw after the same has been set, a threaded plug 13 is threaded into the projection 10, which latter of course is interiorly threaded for the purpose. The plug 13 is provided with a screw kerf 14 by which the plug may be removed when desired and by means of which it may be securely forced to a position to bear directly upon the head 12 of the wood screw 11.

Any conventional means, such for example as a slight offsetting of the threads of the plug or a careful fitting of the threaded connection, may be employed to insure that the plug, when seated, will not become dislodged or loosened through any use of the implement.

The free end of the plug 13 is substantially flush with the outer surface of the holding element, so that there is no projection at this point in the connection. Obviously, with the plug 13 seated firmly against the head of the wood screw and the latter firmly embedded in the end of the handle, there is no possibility of such wood screw turning or moving in a direction to interrupt the connection, and thus the handle and implement head are rigidly and firmly connected against possibility of loosening, so far as the connection is concerned, during the use of the implement.

In the event it becomes necessary to replace the handle, it is only necessary to remove the plug 13, disconnect the wood screw 11 and remove the holding element which, following the disconnection of the plug and wood screw, is free of any direct connection with any part of the implement.

Aside from the parts of the connecter described, the only operation necessary in carrying out the connection is the boring of an appropriate depression 5 at the proper place in the end of the handle, so that the replacement of the handle in the implement head is a simple matter and one which may be readily carried out by anyone, whether skilled or not.

It, of course, may be contemplated to use a handle other than of wood, for example a metal handle. In such instance, the screw 11, here described as a wood screw, would of course be replaced by an appropriate threaded stud or like element which would cooperate with a threaded opening or hole in the end of the handle. Thus, the screw 11, here shown as a wood screw, is intended to indicate any type of threaded element which will appropriately cooperate with and hold the handle with due regard to the material of which the handle may be made.

The connecter as a whole is designed for removably connecting the implement proper to the handle in a manner to insure rigidity of connection and maintain that rigidity of connection during the life of the parts. The holding effect of the wood screw 11 or its equivalent is of known effectiveness and the provision of means by which the wood screw is prevented from becoming loosened or even turning to the slightest degree insures that the connection incident to the use of the wood screw or its equivalent will be maintained and that during such maintenance it is impossible not only to separate the handle from the implement head but to move that handle relative to the head in any degree which might tend to a loosened connection.

What is claimed to be new is:

1. A handle connecter for implements of the type formed with an eye to receive the handle, including a plate bearing upon the implement head beyond and surrounding the eye, a hollow extension carried by the plate and fitted in a depression formed in the adjacent end of the handle, a threaded element passing through the projection and taking into the material of the handle, said element being limited in movement toward the handle by the projection, and means removably cooperating with the projection to bear upon the threaded element and prevent unthreading movement thereof when in applied position.

2. A handle connecter for implements of the type consisting of a head formed with an eye to receive the handle and wherein the inserted handle terminates short of one end of the eye, including a plate bearing on the head beyond the eye, said plate having a portion snugly fitting within the eye and bearing on the end of the handle, said plate being further formed with a hollow projection to seat in an opening in the end of the handle, a threaded element passing through the bottom of the projection and threaded into the handle, and a screw plug threaded into the projection and bearing directly on the end of the threaded element.

3. A handle connecter for implements of the type consisting of a head formed with an eye to receive a handle, including a plate bearing on the head in opposition to the removal direction of the handle, said plate having a portion conforming to and fitting within the eye to bear upon the end of the handle, a hollow projection integral with the plate and extending toward the handle, said projection fitting snugly within a depression formed in the handle, a screw passing through an opening in the bottom of the projection and threaded directly into the handle, and a plug threaded into the projection and bearing directly upon and preventing unthreading movement of the screw.

4. A handle connecter for implements of the type wherein the head is formed with an eye to receive a handle, a handle fitted in said eye and terminating short of the remote end of the eye, a plate conforming to and fitted into the eye to bear upon the end of the handle, said plate having an edge flange to bear upon the metal of the head surrounding the eye to prevent movement of the plate in a direction toward the handle, a projection integral with the plate and fitted into a depression formed in the end of the handle, said projection being hollow and interiorly threaded, the end of the projection remote from the handle opening into the plate and the end of the projection next the handle being closed except for a central opening of less diameter than the interior diameter of the projection, a screw to be passed through the opening in the end of the projection next the handle and threaded into the handle, the head of the screw engaging the end of the projection to limit the setting of the screw, and a plug threaded into the projection and bearing upon and engaging the head of the screw.

5. An implement head, a separable handle to be inserted in the head, an element cooperating with and engaging the head to limit movement of the element toward the handle, said element having an extension seated in the end of the handle, removable means passing through such extension and entering the handle to secure the handle and head together, and means cooperating with such extension and engaging such removable means to fix the latter against removal from the handle.

JAMES W. HARGRAVE.